March 13, 1928.
B. R. SCHNEIDER
1,662,173
ADJUSTABLE CLAMPING STRAP FOR MILLING AND LIKE MACHINES
Filed April 21, 1926    2 Sheets-Sheet 1
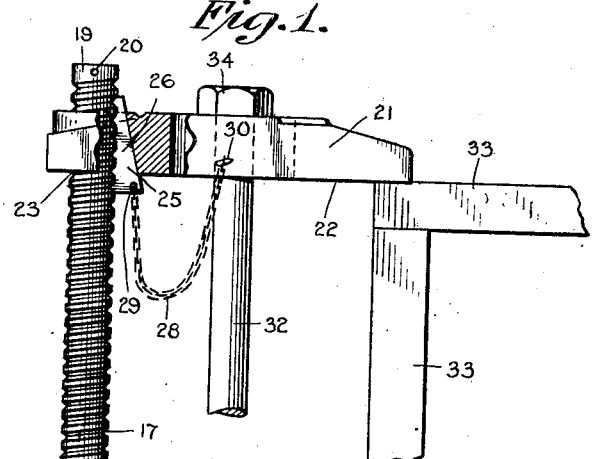
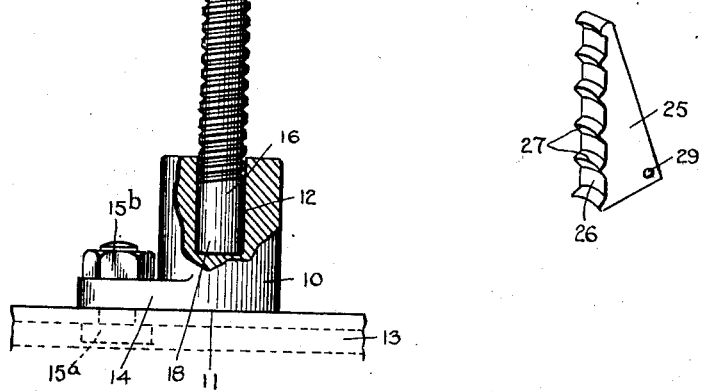
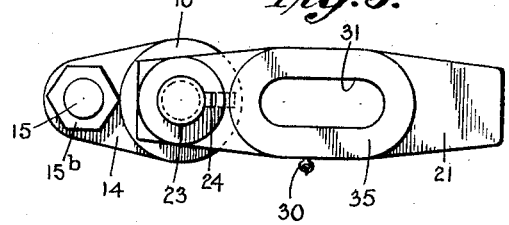
INVENTOR,
Bernard R. Schneider,
BY
Henry J. Lucke,
ATTORNEY.

March 13, 1928.

B. R. SCHNEIDER 1,662,173

ADJUSTABLE CLAMPING STRAP FOR MILLING AND LIKE MACHINES

Filed April 21, 1926    2 Sheets-Sheet 2

INVENTOR,
Bernard R. Schneider,
BY
Henry J. Luecke,
ATTORNEY.

Patented Mar. 13, 1928.

1,662,173

UNITED STATES PATENT OFFICE.

BERNARD R. SCHNEIDER, OF JERSEY CITY, NEW JERSEY.

ADJUSTABLE CLAMPING STRAP FOR MILLING AND LIKE MACHINES.

Application filed April 21, 1926. Serial No. 103,595.

This invention relates to adjustable clamping straps for milling and like machines.

Pursuant to a preferred form of my invention, my clamping strap is constructed to adjustably position the work for milling, planing, boring, turning, slotting, shaping or other operations by a suitable machine-shop machine or the like, and comprises a base arranged to be non-tiltable and having a recess for receiving an upright member provided with screw-threading or set of notches, respectively disposed at graduated locations longitudinally of the upright member, a clamping strap, a keeper preferably of a wedge form and provided with partial screw threading or other graduated set of projections and recesses coacting with the graduated set of notches of the upright member for affording ready positioning and releasing of the work relative to the base and to the operation performing machine, said clamping strap being provided with a smooth or other non-threaded opening to adjustably receive said wedge member and the threaded portion of said upright member.

Pursuant to my invention, the clamping strap and its clamping bolt are positioned to a nicety to thereby afford the clamping to any degree of a casting or other work relative to the table or other supporting of the operation performing machine, such adjustment being effected speedily and most readily for setting-up and releasing the work.

Further features and objects of the invention will be more fully understood from the following detail description and the accompanying drawings, in which Fig. 1 is a side elevation, partly broken away in cross-section, of one form of my invention;

Fig. 2 is a detail view in perspective, showing the form of wedge keeper illustrated in Fig. 1, but on a somewhat enlarged scale;

Fig. 3 is a top plan view of Fig. 1;

Figure 4:
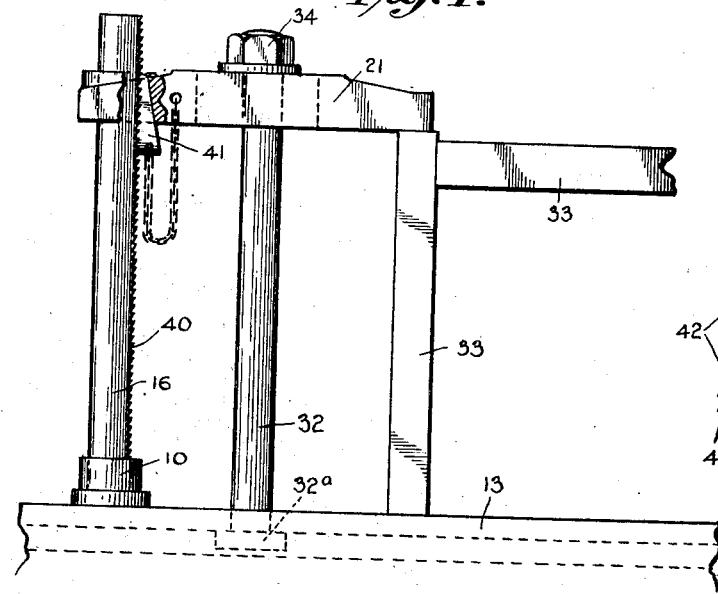
Fig. 4 is a side elevation of another form of my invention, partly broken away in section.

Referring to Figs. 1, 2 and 3, my adjustable clamping strap comprises a base member 10 arranged to be variably positioned on a suitable support such as the regulation T-slotted table or the like of a milling machine, planer, shaper or the like, for which purpose its bottom face 11 is flat to render it non-tiltable and preferably planed to accuracy at right angles to the axis of the vertically extending recess 12. To locate the base member 10 on the regulation table, indicated at 13, I provide the extension 14 having a suitable opening for receiving a clamping bolt 15, the head 15$^a$ of which is slidably received in a T-slot of the table 13, and its nut 15$^b$ tightened at the desired location. The graduated upright member 16 in this instance is provided with screw threading 17 preferably of helical type and of suitable lead and pitch. The bottom portion 18 of said upright member 16 is in this instance smooth and of a diameter to make a nice fit with the circular face of the vertically extending recess 12 of the base member 10. The upper end portion 19 of the upright member 16 may be provided with a set of openings 20 for receiving a pin or the like for the purpose of rotating the upright member 16 for securing the desired relation of its screw-threading 17 relative to the wedge keeper and clamping strap as is explained more fully hereinafter.

The clamping strap, see Figs. 1 and 3, comprises the body portion 21 having an under face 22 for engagement directly or indirectly with the work. The clamping strap is provided with an opening 23 through which the upright member 16 is received. The face of the opening 23 may be substantially smooth or approximately smooth or not, but of a cross-sectional area for readily receiving any screw-threaded portion of the upright member 16 and is further provided with the tapered, vertically extending slot 24 corresponding in taper to the wedge formation of the wedge member 25, which wedge member is provided on its effective face 26, see Fig. 2, with a set of spaced projections 27 and resulting corresponding recesses conforming generally to the formation of the threading 17, whereby upon positioning the wedge member 25 within such slot 24 of the strap 21, the wedge member 25 and the strap 21 are automatically located in position at the desired height relative to the upright member 17 and accordingly relatively to the table 13 or other support, to thereby clamp the work as may be desired.

The wedge member 25 may be provided with a chain 28 having its one end 29 connected in a recess in the wedge member 25 and its other end suitably secured to the clamping strap 21 as by means of the recess lug 30.

The clamping strap 21 is provided with the slot 31 for receiving a bolt 32 for clamping the strap 21 in the desired position.

In Fig. 1, I have indicated the work 33 such as a casting on which the milling or other operation is to be performed. By means of my adjustable clamp, hereinabove described, the strap member 21 is located in proper horizontal position by approximately positioning its opening 23 along the threading 17 of the upright member 16, with the wedge member 25 out of position. The wedge member 25 is then placed in locking position by inserting it in the tapered slot 24 of the clamping member 21 and the final desired adjusted position of the clamping member 21 is attained by placing the pin or other tool in one of the openings 20 and rotating the upright member 16 to the desired final position, whereafter the bolt 32 having its head 32$^a$ passed in a T-slot of the table 13 and its body portion passed through the slot 31 of the clamping member 21 and its upper threaded end locked by its nut 34, whereupon the work 33 is clamped in the desired position for carrying out the desired milling or other operation.

The clamping member 21 is preferably a drop forging for strength and cheapness of cost, and is usually re-inforced by a flange 35 extending about its slot 31.

It will be understood that clamping members 21 of various lengths and other dimensions and similarly provided with an opening 23 and slot 31 may be employed with a single clamping set-up embodying my invention.

Figure 5:
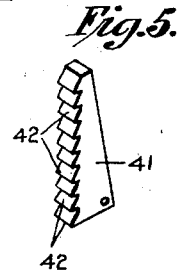
Fig. 5 is a detail view in perspective of the wedge keeper shown in Fig. 4, on a somewhat enlarged scale.

In the form of my invention shown in Figs. 4 and 5, the upright member 16 is provided with a set of teeth 40 disposed vertically at one side of the upright member 16. The wedge member 41 is correspondingly provided with a set of teeth 42 and intermediate spaces corresponding to the teeth 40 and their intermediate spaces. Otherwise, the arrangement shown in Fig. 4 corresponds generally to that shown in Figs. 1 and 3 and like parts are designated by like reference numbers.

It will be observed from Figs. 2 and 5 in particular, that I prefer to slope downwardly the teeth or other form of projections of my wedge-shaped member, and correspondingly slope the teeth or other form of projections of the upright with which such teeth or other projections of the wedge-shaped member coact, thus affording what is aptly termed "ratcheting" relationship between such wedge-shaped member and the upright, and enabling my invention to be employed with the use of a minimum clearance between the upright and the horizontally extending clamping strap or equivalent, which is locked in position after the wedge-shaped member has been "ratcheted" into locking position.

Figure 6:
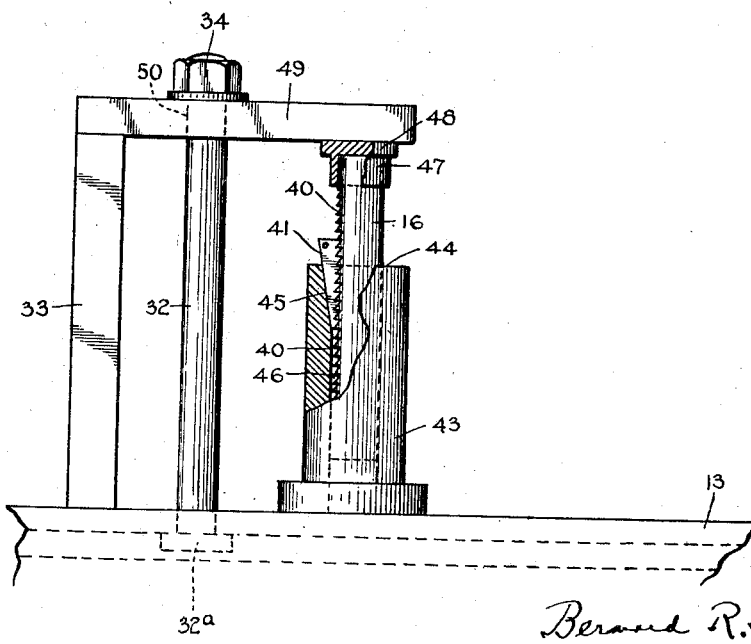
Fig. 6 is a side elevation, partly broken away in section, of a further modification of my invention.

In the modification shown in Fig. 6, the vertical adjustment of the upright member 16 by its wedge member 41 is attained in coaction with the base member 43 which in this instance is provided with an elongated hollow body portion, the inner face of its vertical extending opening 44 being cylindrical and of a diameter to make a nice fit with the cylindrical portion of the upright member 16, the remainder of the inner face of the opening 44 being in the form of a slot, the upper end portion 45 is tapered to receive and lock therein the wedge member 41 and the lower portion 46 of which slot is of a reduced dimension but sufficient to clear the teeth 40 of the upright member 16. The upper end of the upright member 16 is loosely received within the socket member 47 having a protective upper head 48 of enlarged diameter to afford sufficient support for the clamping bar 49 extending from the upper face of the head 48 to the work 33 when the bolt 32 is passed through the slot 50 of the clamping bar 49.

In the use of my invention as illustrated in Fig. 6, the upright member 16 is elevated manually relative to the base member 43 to an approximate position but lower than the final adjusted position to thereby dispose the clamping strap 49 in a corresponding approximate position and the wedge member 41 is then placed in the slot 45. The final position of the upright member 16 is attained by grasping the upright member 16 in one hand to lift it further to its final position while the wedge member 41 is slightly lifted and moved away from the upright member 16 by the other hand until the final position of the upright member has been attained and the wedge member 41 is then left freed in the slot 45 to assume under gravity its final and locking position relative to the upright member 16.

From the above, it appears that my invention provides, broadly stated, the combination of a member provided with a tapered opening, a wedge member provided with a set of projections and of a taper corresponding generally to the taper of the tapered opening, an upright member provided with a set of projections corresponding to the set of projections of the wedge member and a strap member adjustably supported by the upright member; or, stated more specifically, for a clamping strap or equivalent having a smooth or other wholly or partially non-threaded opening and including a tapered slot, combined with a wedge member provided with partial threading or other set of spaced projections and an upright member having threading or other set of projections coacting with the threading or projections of the wedge member to afford ready assembly of the above parts in the preliminary setting up of the work and ready accurate adjustment of the setting up by regulation of the upright member.

Whereas, I have described my invention by reference to specific forms thereof, it will be understood that many changes and modifications may be made without departing from the spirit of the invention.

I claim:

1. In an adjustable set-up device, the combination of an upright having a body portion provided with a vertically aligned set of laterally extending projections, a horizontally extending member provided at one end thereof with an opening at one side including a tapered slot for receiving said body portion of said upright, the side of said opening opposite said one side being substantially smooth, means for exerting pressure downwardly on said horizontally extending member, and a wedge-shaped member arranged to be positioned within said tapered slot to hold said horizontally extending member against downward displacement, said wedge-shaped member having a substantially smooth face for engagement with said substantially smooth side of the opening and further having a face provided with laterally extending projections coacting with said vertically aligned set of laterally extending projections of said upright.

2. In an adjustable set-up device, the combination of an upright having a body portion provided with a vertically aligned set of laterally extending projections, a horizontally extending substantially integral member provided at one end thereof with an opening at one side including a tapered slot for receiving said body portion of said upright, the side of said opening opposite said one side being substantially smooth, means for exerting pressure downwardly on said horizontally extending member, and a wedge-shaped member arranged to be positioned within said tapered slot to hold said horizontally extending member against downward displacement, said wedge-shaped member having a substantially smooth face for engagement with said substantially smooth side of the opening and further having a face provided with downwardly sloped laterally extending projections co-acting with said vertically aligned set of laterally extending projections of said upright.

3. In an adjustable set-up device, the combination of an upright having a body portion provided with a vertically aligned set of laterally extending projections, a hollow member for freely receiving a lower portion of said upright, a horizontally extending member provided at one end thereof with an opening at one side including a tapered slot for receiving said body portion of said upright, the side of said opening opposite said one side being substantially smooth, means for exerting pressure downwardly on said horizontally extending member, and a wedge shaped member arranged to be positioned within said tapered slot to hold said horizontally extending member against downward displacement, said wedge-shaped member having a substantially smooth face for engagement with said substantially smooth side of the opening and further having a face provided with laterally extending projections co-acting with said vertically aligned set of laterally extending projections of said upright.

4. In an adjustable set-up device, the combination of an upright having a body portion provided with a vertically aligned set of laterally extending projections, a horizontally extending substantially integral member, means for exerting downward pressure on said horizontally extending member, a hollow member for freely supporting a lower portion of said upright, one of said members being provided with an opening having at one side thereof a tapered slot, the opposite side of said opening being substantially smooth, and a wedge-shaped member arranged to be positioned within said tapered slot to hold said horizontally extending member against downward displacement, said wedge-shaped member having a substantially smooth face for engagement with said substantially smooth side of the opening and further having a face provided with laterally extending projections co-acting with said vertically aligned set of laterally extending projections of said upright.

In testimony whereof I have signed this specification this 20th day of March, 1926.

BERNARD R. SCHNEIDER.